(12) United States Patent
Noblanc et al.

(10) Patent No.: US 8,690,265 B2
(45) Date of Patent: Apr. 8, 2014

(54) DUAL WHEELS WITH COMMON HUB ADAPTER

(75) Inventors: Olivier Noblanc, Montclair, NJ (US);
Lars Johan Resare, Ewing, NJ (US);
Aysel Poyrazli, Levittown, PA (US);
Matthew P. Sherman, Philadelphia, PA (US); Larry K. Rogers, Bordentown, NJ (US)

(73) Assignee: Hutchinson, SA, Paris (FR)

( * ) Notice: Subject to any disclaimer, the term of this patent is extended or adjusted under 35 U.S.C. 154(b) by 218 days.

(21) Appl. No.: 13/111,802

(22) Filed: May 19, 2011

(65) Prior Publication Data
US 2012/0292979 A1 Nov. 22, 2012

(51) Int. Cl.
*B60B 11/00* (2006.01)
(52) U.S. Cl.
USPC ........................................................ 301/36.1
(58) Field of Classification Search
USPC ............ 301/35.628, 36.1; 152/415, 416, 417, 152/418
See application file for complete search history.

(56) References Cited

U.S. PATENT DOCUMENTS

| | | | | |
|---|---|---|---|---|
| 3,790,218 | A * | 2/1974 | Johns | 301/36.1 |
| 4,164,358 | A * | 8/1979 | Entrup | 301/36.1 |
| 4,220,372 | A * | 9/1980 | Johansen et al. | 301/1 |
| 4,277,107 | A | 7/1981 | Stone | |
| 4,470,637 | A | 9/1984 | Kopp et al. | |
| 4,772,074 | A | 9/1988 | Brieser et al. | |
| 4,787,679 | A | 11/1988 | Arnold | |
| 4,902,074 | A * | 2/1990 | DeRegnaucourt et al. | 301/13.2 |
| 5,083,597 | A | 1/1992 | France | |
| 5,535,516 | A * | 7/1996 | Goodell et al. | 29/894.361 |
| 6,250,722 | B1 * | 6/2001 | Radke | 301/36.1 |
| 6,568,764 | B2 | 5/2003 | McNeil et al. | |
| 7,040,713 | B2 | 5/2006 | Rudolf et al. | |
| 7,237,329 | B2 | 7/2007 | Burston et al. | |
| 7,413,259 | B2 | 8/2008 | Verdun et al. | |

(Continued)

FOREIGN PATENT DOCUMENTS

| | | |
|---|---|---|
| JP | 5-28704 | 4/1993 |
| JP | 07-195903 | 8/1995 |
| JP | 11-078407 | 3/1999 |

OTHER PUBLICATIONS

International Search Report for corresponding International Application PCT/US11/037232, May 19, 2011.

(Continued)

*Primary Examiner* — S. Joseph Morano
*Assistant Examiner* — Jean Charleston
(74) *Attorney, Agent, or Firm* — Reed Smith LLP

(57) ABSTRACT

A dual wheel assembly for a vehicle having a common hub adapter. The assembly includes an inner wheel having an inner rim; an outer wheel having an outer rim; and a hub portion having a central cylindrical portion disposed between first and second end face portions, wherein the inner rim is mounted to the first end portion, and the outer rim is mounted to the second end face portion. The assembly may further include radially spaced apart holes disposed on the central cylindrical portion, wherein the spaced apart holes have end openings on opposite sides thereof and first and second fasteners extending in opposite directions in an alternating arrangement from the first and second end portions of the hub portion. Each of the first fasteners extends through an end opening of a spaced apart hole and the inner rim, and each of the second fasteners extends through an end opening of a spaced apart hole and the outer rim.

12 Claims, 14 Drawing Sheets

(56) References Cited

U.S. PATENT DOCUMENTS

| | | |
|---|---|---|
| 2007/0278845 A1 | 12/2007 | Vandendriessche et al. |
| 2009/0102275 A1 | 4/2009 | Rivera et al. |
| 2010/0052409 A1 | 3/2010 | Ikeda |
| 2010/0163148 A1 | 7/2010 | Rogers |
| 2010/0194180 A1 | 8/2010 | Gibson |
| 2011/0057503 A1 | 3/2011 | Marsaly et al. |

OTHER PUBLICATIONS

Written Opinion of the International Search Report for corresponding International Application PCT/US11/037232, May 19, 2011.

* cited by examiner

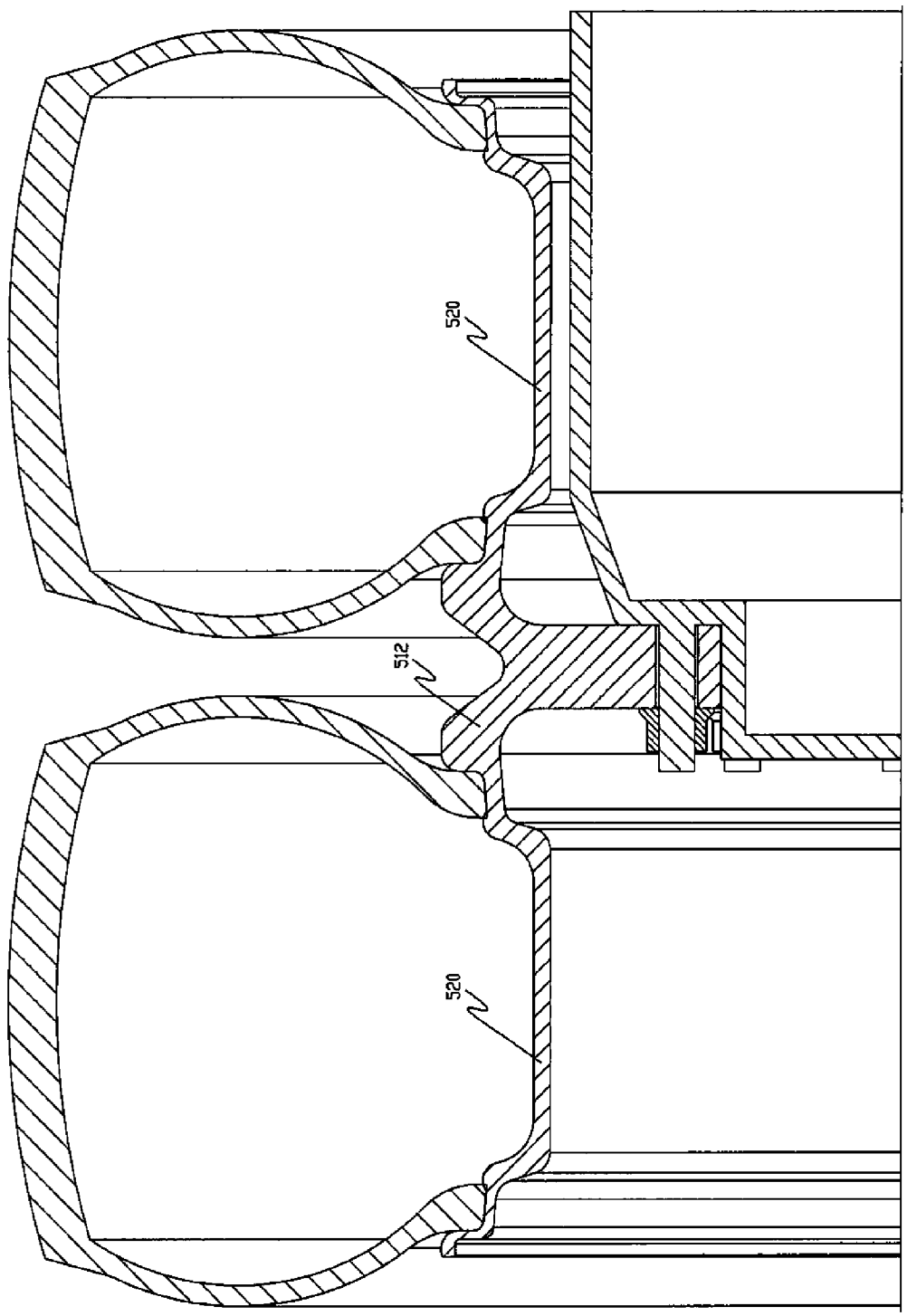

US 8,690,265 B2

DUAL WHEELS WITH COMMON HUB ADAPTER

FIELD OF THE INVENTION

This application discloses an invention which is related, generally and in various embodiments, to dual wheels having a common hub.

BACKGROUND OF THE INVENTION

A conventional arrangement of dual wheels mounted to a hub is shown in FIG. 1. This arrangement is common in the commercial heavy truck industry. For dual wheel mounting, the hub has protruding studs. The inner dual wheel with tire is assembled onto the hub, then the outer dual wheel with tire is assembled to the hub, and then a flange nut secures both wheels to the hub assembly. Wheels can be centered on the hub or by use of conical or ball seat nuts so that the wheels are centered using the studs. The conventional arrangement shown in FIG. 1 tends to have relatively high stresses in the disc area, the entire wheel often must be replaced in the event of the wheel cracking under load (which can result in higher replacement costs), the studs tend to protrude a further distance from the hub so that they can go through both wheel discs and be secured with a nut, and fretting and corrosion can occur between the two discs of the dual wheels.

Another conventional arrangement of dual wheels is shown in FIGS. 2A-2C. This design, also typically used on heavy trucks, utilizes two-piece bolt-together wheels. Like one-piece wheels, two-piece bolt-together wheels are assembled to the vehicle using studs and flange nuts or conical or ball seat nuts. Dual wheels may also be made as a multi-piece design utilizing flat base rims, side rings and/or locking rings. The cast hub of FIGS. 2A-2C tends to be relatively heavy and the assembly tends to be relatively difficult to align properly resulting in poor ride quality, the risk of wheels becoming loose, imbalance, chording of rims if clamps are over-tightened and difficulty in reaching the inflation valve of the inner dual.

Another conventional arrangement of dual wheels on commercial vehicles is shown in FIG. 3. This arrangement uses a cast hub with two demountable rims. The demountable rims are typically separated with a spacer band and secured by a clamp which is attached with hub studs and nuts. Some construction type vehicles utilize this design because of the robustness of the cast hub and the space needed for the hub drive train.

Another conventional arrangement is shown in FIG. 4. This arrangement uses cap screws or bolts to secure each dual wheel directly to the hub. The arrangement of FIG. 4 tends to use a relatively significant number of fasteners to secure each rim assembly. Also, maintenance tends to be difficult due to the high number of fasteners, and extremely limited access to the cap screws for the inner dual.

Yet another arrangement is described in U.S. patent application Ser. No. 12/365,252 publication number US 2010/0194180 A1 published on Aug. 5, 2010, the disclosure of which is incorporated by reference herein. This arrangement uses a spindle with a separate hub mount bearing. Two wheels are then attached to the hub mount bearing. This arrangement tends to include excessive weight, potential for misalignment (which in turn can cause poor ride quality), imbalance, and restricted access to the inflation valve of the inner dual.

BRIEF DESCRIPTION OF THE DRAWINGS

Various embodiments of the invention are described herein in by way of example in conjunction with the following figures, wherein like reference characters designate the same or similar elements.

FIG. 12 illustrates a partial cross-sectional view of a dual wheel assembly according to various embodiments of yet another dual wheel assembly.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
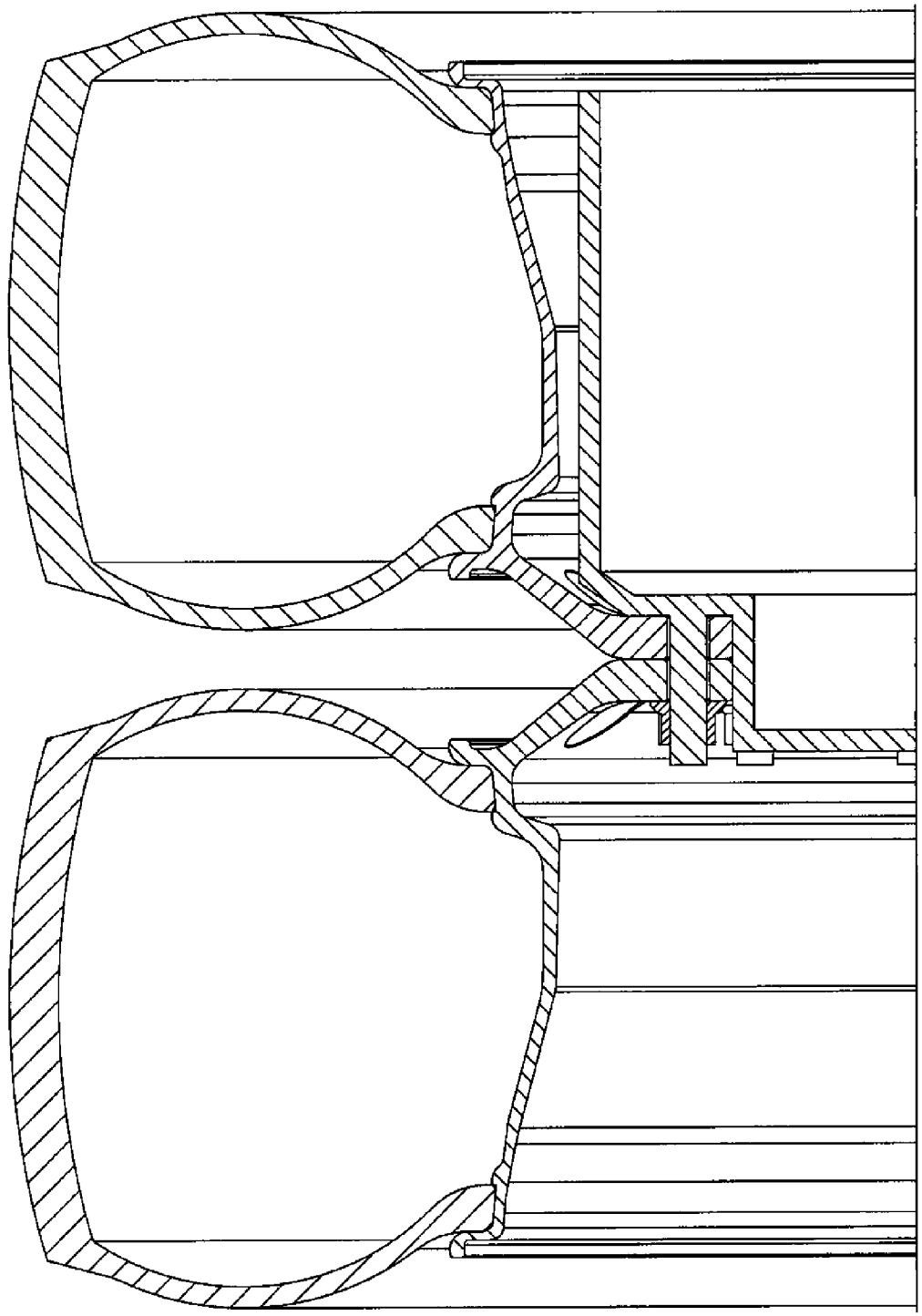
FIG. 1 illustrates a partial cross-sectional view of a dual wheel assembly according to a prior art design.
Figure 2A:
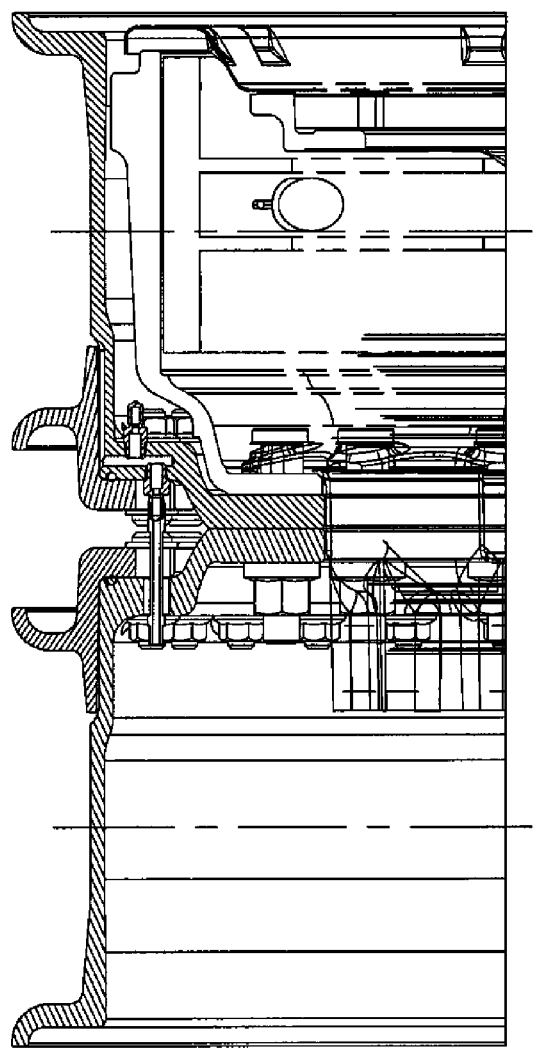
FIGS. 2A, 2B and 2C illustrate partial cross-sectional, end and perspective views of a dual wheel assembly according to another prior art design.
Figure 2C:
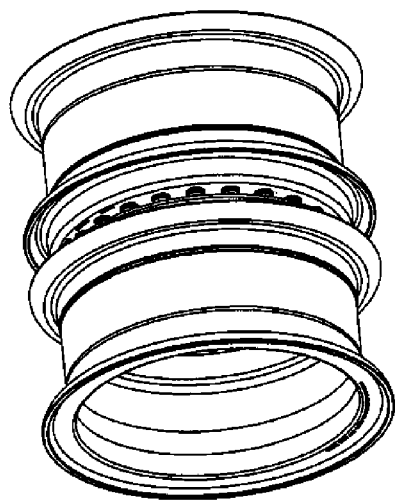
Figure 2B:
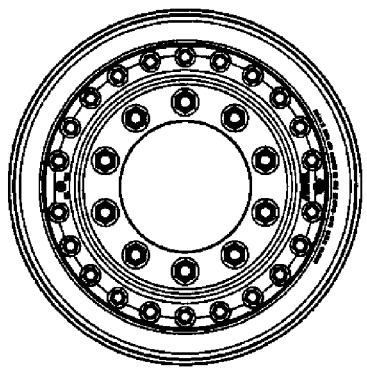
Figure 3:
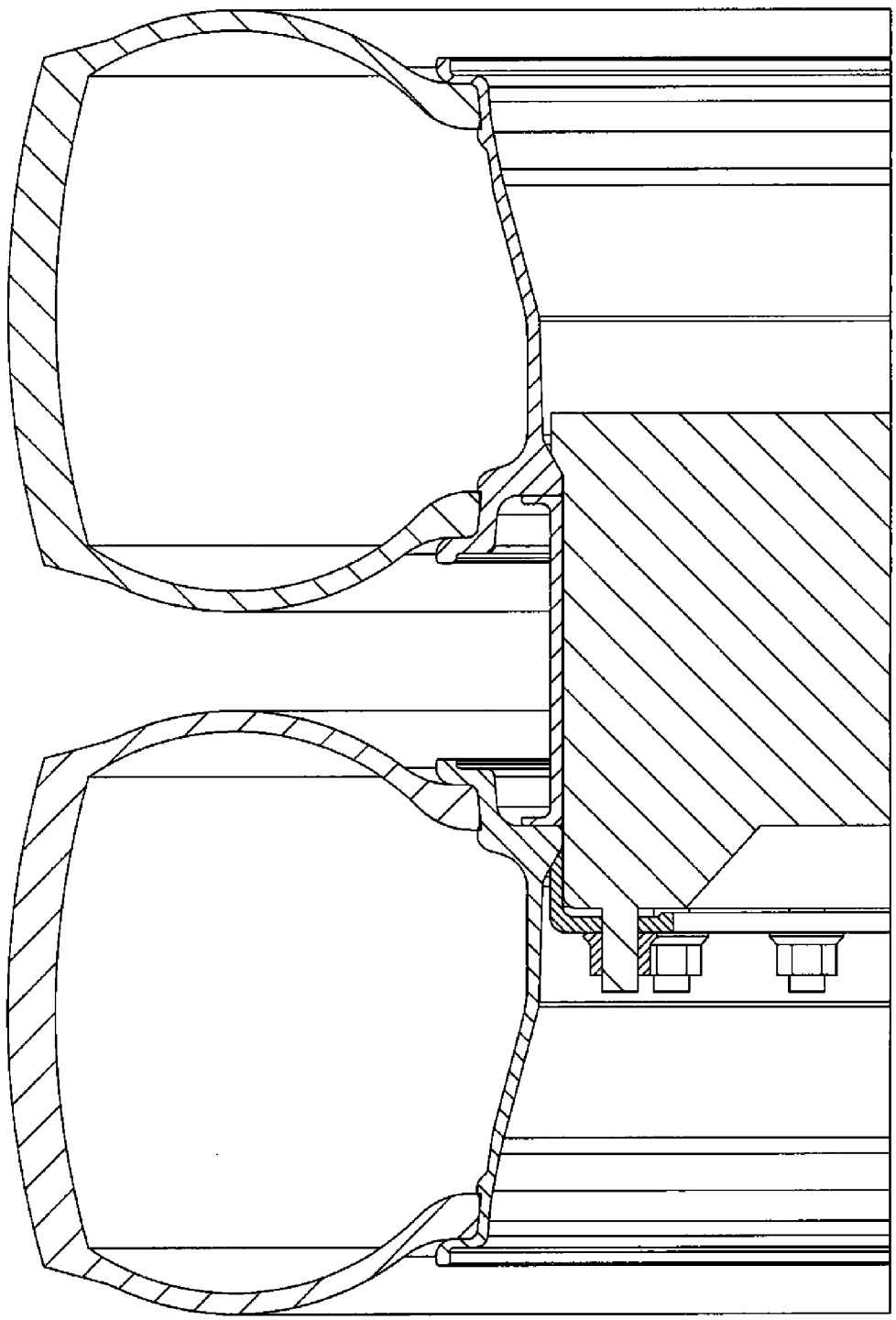
FIG. 3 illustrates a partial cross-sectional view of a dual wheel assembly according to another prior art design.
Figure 4:
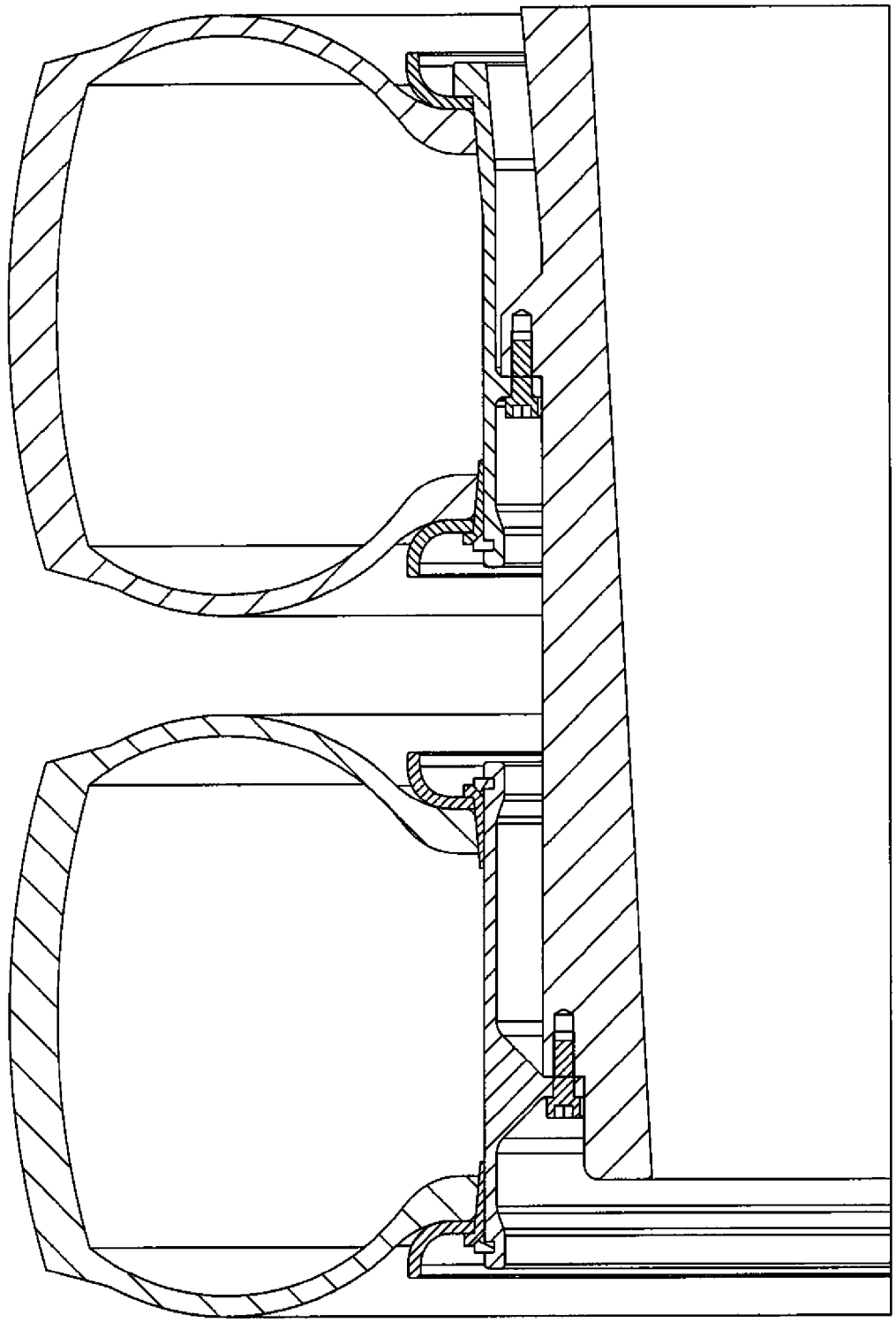
FIG. 4 illustrates a partial cross-sectional view of a dual wheel assembly according to yet another prior art design.
Figure 5A:
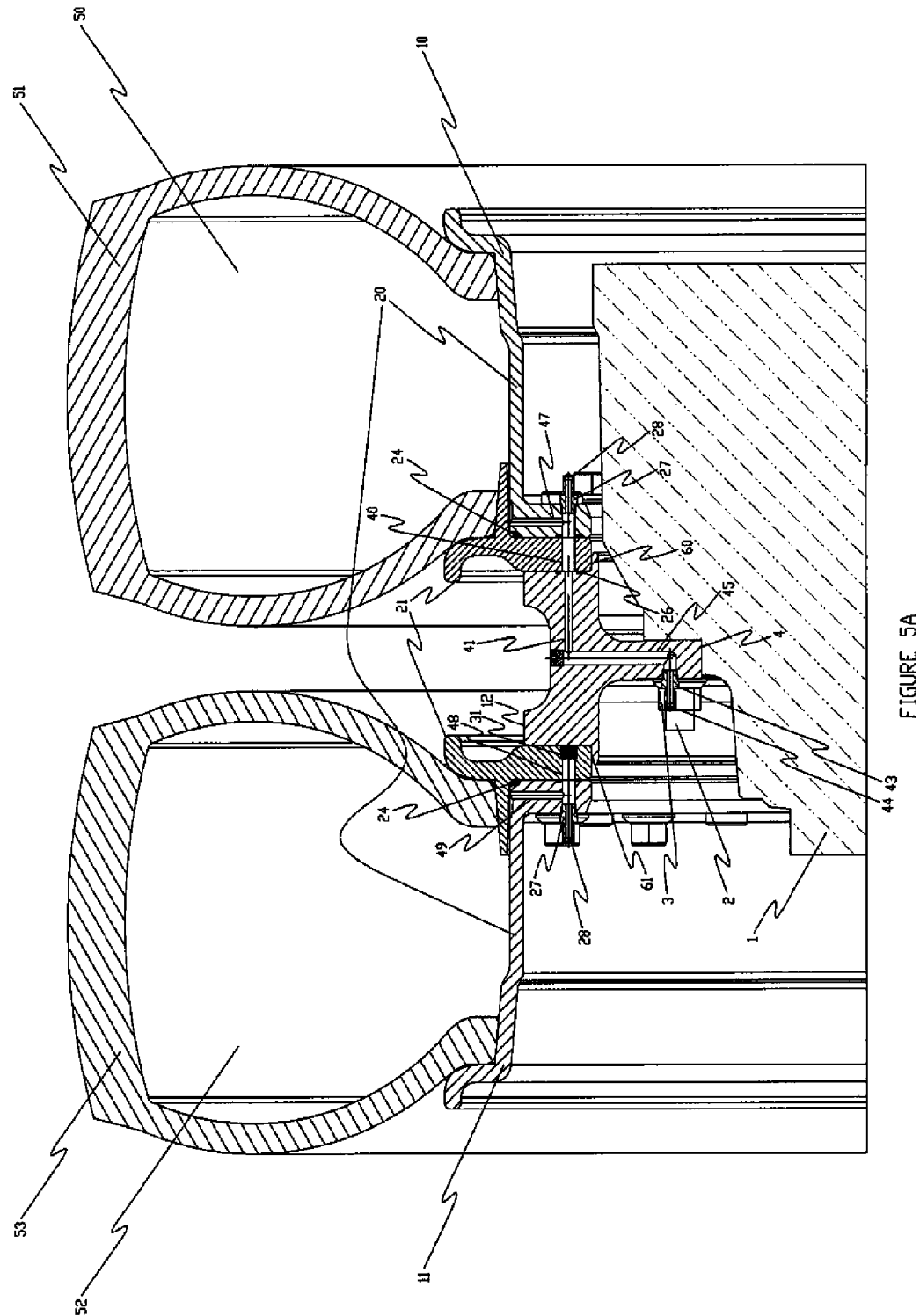
FIG. 5A illustrates a partial cross-sectional view of various embodiments of the dual wheel assembly.
Figure 5B:
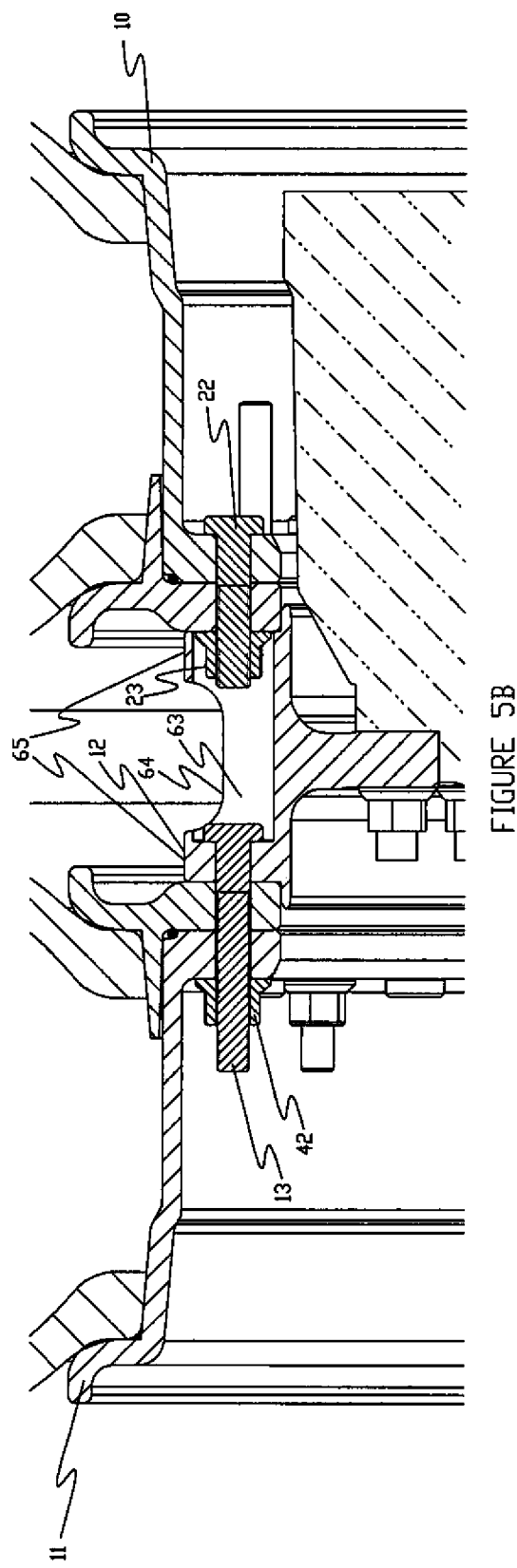
FIG. 5B illustrates another partial cross-sectional view of various embodiments of the dual wheel assembly of FIG. 5A.
Figure 5C:
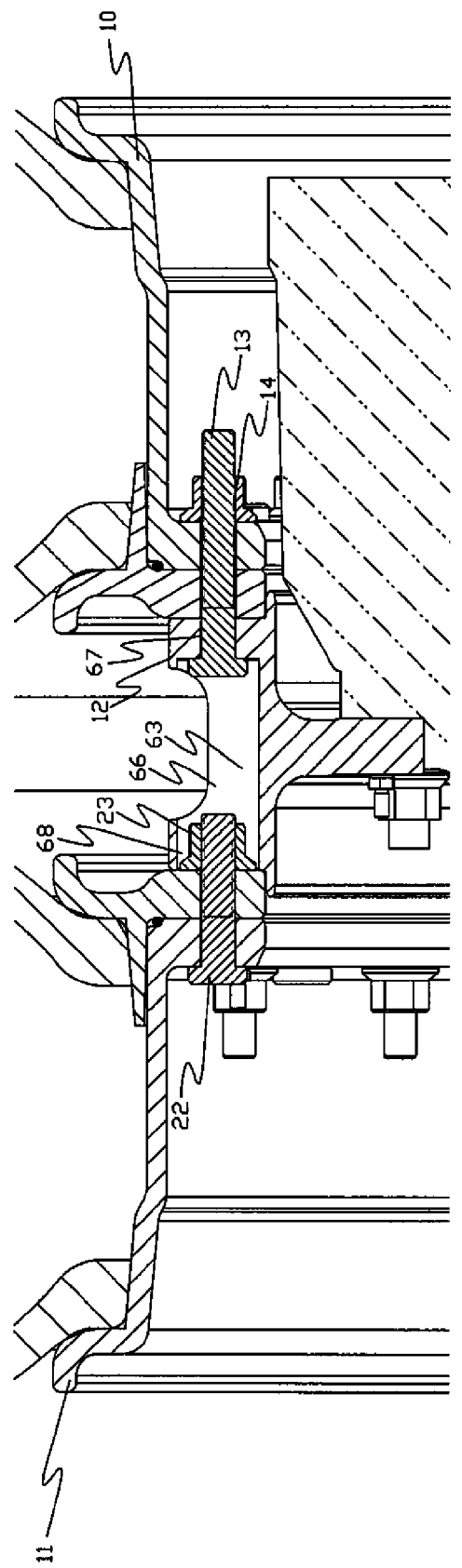
FIG. 5C illustrates yet another partial cross-sectional view of various embodiments of the dual wheel assembly of FIG. 5A.
Figure 6:
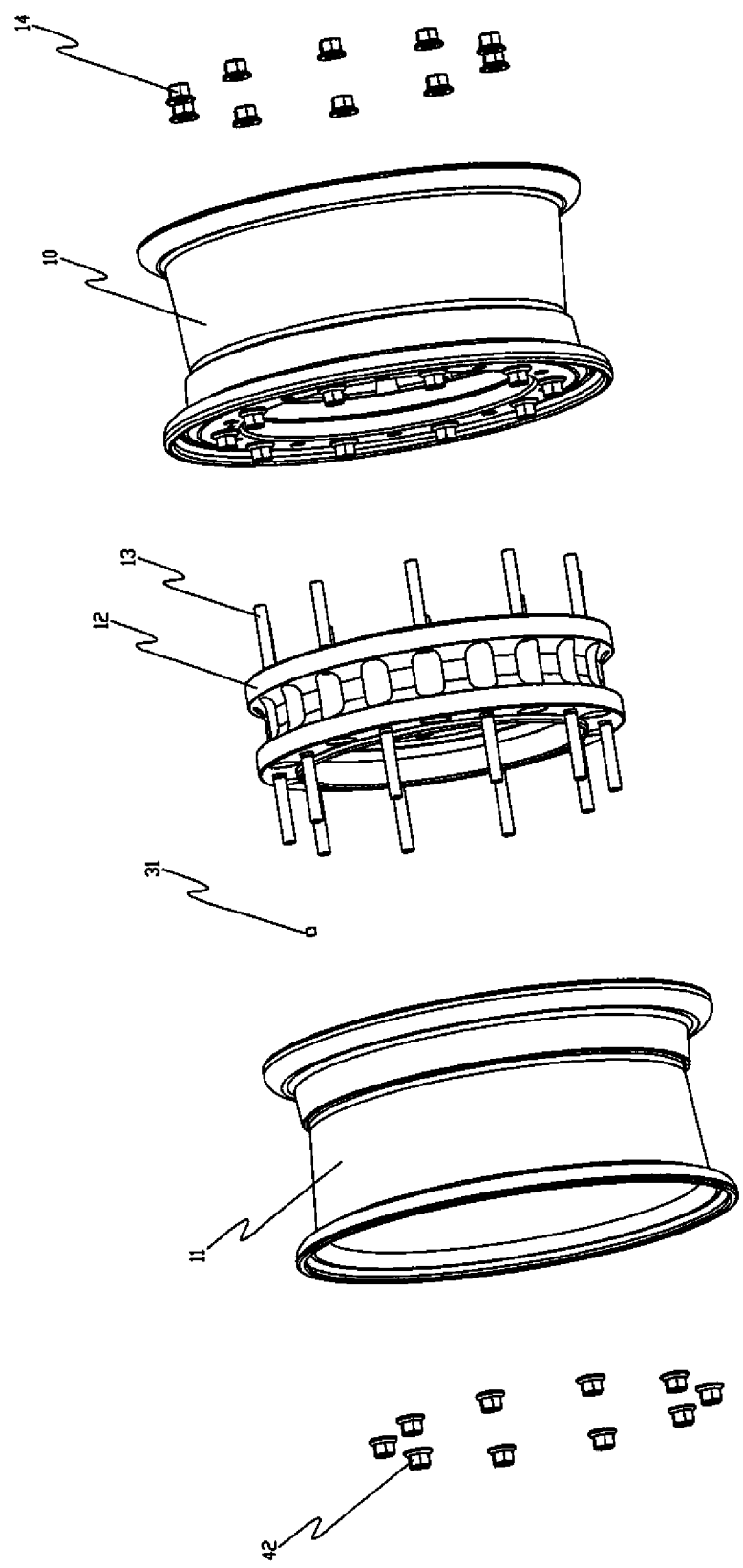
FIG. 6 illustrates an exploded perspective view of various embodiments of the dual wheel assembly.

FIGS. 5A-7 illustrate various embodiments of a dual wheel assembly. FIG. 5A shows an assembly of the dual wheels 10 and 11 coaxially mounted with a central spacer portion or hub adapter 12 and vehicle hub 1. FIG. 6 shows an exploded view of the dual wheels 10 and 11 and hub adapter 12. FIG. 6 shows an exploded view of the inner dual wheel 10. The arrangement of FIG. 7 also applies to outer dual wheel 11.

Figure 7:
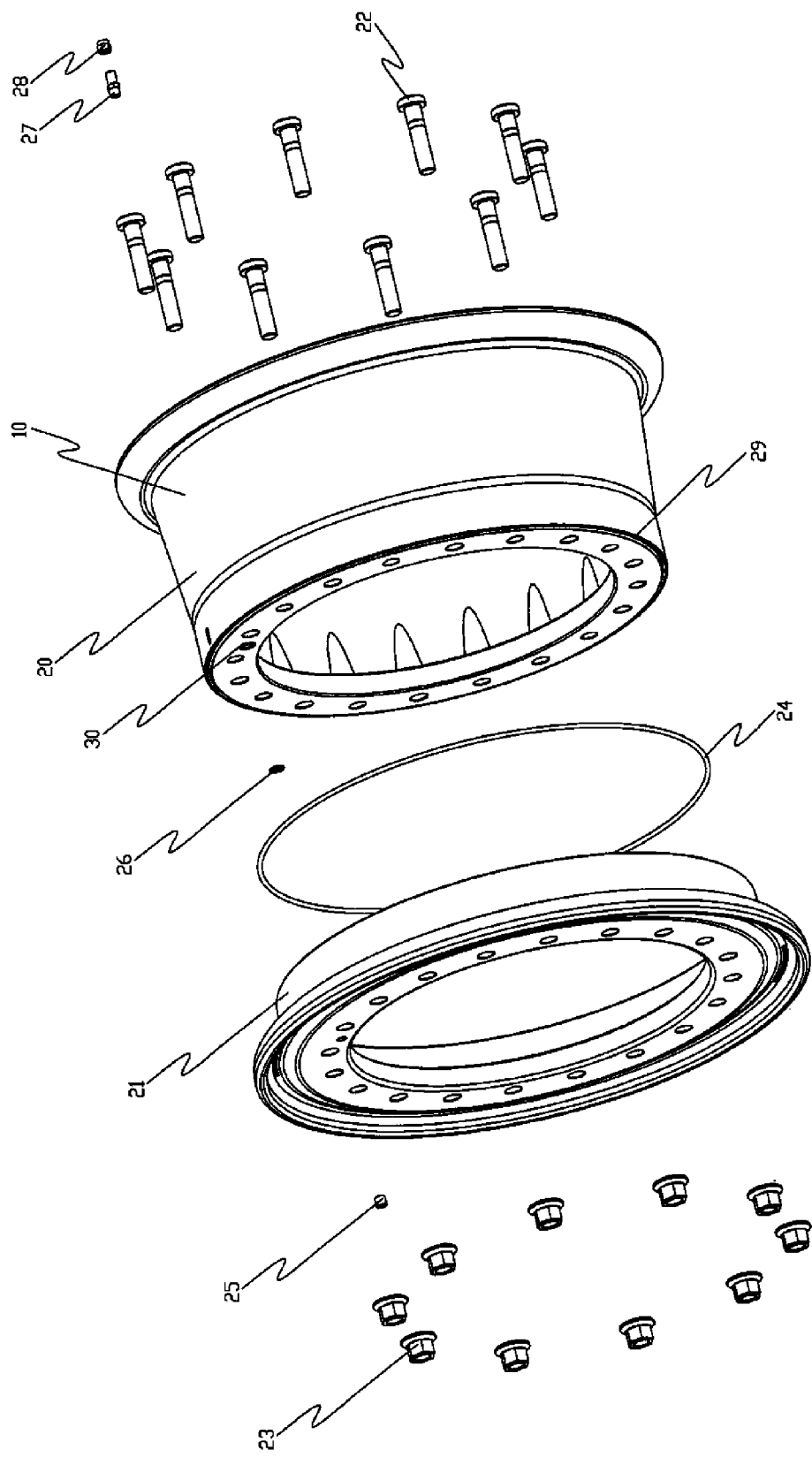
FIG. 7 illustrates an exploded perspective view of various embodiments of the inner wheel of the dual wheel assembly.

Referring to FIG. 7, the inner dual wheel 10 includes a rim base 20 and rim flange 21 which are bolted together using rim assembly fasteners or studs 22 and assembly nuts 23. Wheel sealing ring 24 is positioned between the rim base 20 and rim flange 21 to seal air from escaping out of the inner tire cavity 50 (FIG. 5A). Inner dual wheel 10 also has a plug 25 and hub o-ring 26 as well as a valve 27 and valve cap 28 for sealing.

The dual wheel 10 (and likewise dual wheel 11) can be assembled by pressing rim assembly studs 22 into rim base 20. Valve 27 and valve cap 28 are also assembled to rim base 20. Next, wheel sealing ring 24 is placed into the sealing ring groove 29 of rim base 20. Hub o-ring 26 is assembled into the o-ring groove 30. The rim flange 21 is assembled to rim base 20 using assembly nuts 23. The outer dual wheel 11 is assembled in like manner as inner dual wheel 10 except plug 31 (see FIG. 5A) is installed in the rim flange 21. Valve 27 and valve cap 28 are assembled into rim base 20.

Referring to FIGS. 5B, 5C and 6, inner dual wheel 10 is assembled to hub adapter 12 using hub adapter fasteners or studs 13 and assembly nuts 14. FIGS. 5B and 5C show alternating hub adapters studs 13 inserted into the hub adapter 12 and extending in opposite directions. Studs 13 connecting the outer dual wheel 11 to the hub adapter 12 and secured by assembly nuts 42 (FIG. 5B) are alternatingly interspersed between studs 13 connecting the inner dual wheel 10 to the hub adapter 12 and secured by assembly nuts 14 (FIG. 5C). Hub adapter 12 includes a central cylindrical portion 64 disposed between first and second end portions or flange portions 65. Access holes 63 having a semi-exposed central portion 66 are radially-spaced apart and disposed on the central cylindrical portion 64 such that end openings 67, 68 of the access holes 63 are disposed through the end faces of flange portions 65 of hub adapter 12. Each stud 13 extends though an end opening 67 of access hole 63, rim flange 21, rim base 20 and then is secured with nut 42. Specifically, studs 13 include first and second studs 13, wherein the first studs extends through an end opening of a spaced apart hole, the inner rim base and the inner rim flange, and the second studs extends through an end opening of a spaced apart hole, the outer rim base and the outer rim flange. Each stud 22 passes though rim base 20, rim flange 21 and an end opening 68 of access hole 63 and is secured with nut 23.

Referring to FIG. 5A, an air passageway 40 in rim flange 21 is aligned with an air passageway 41 in hub adapter 12. Hub o-ring 26 seals between rim flange 21 and hub adapter 12. Note that inner dual wheel 10 will not inflate unless it is installed to hub adapter 12. At this point, inner dual wheel 10 and hub adapter 12 may be installed on the vehicle hub 1 via lug studs 2 and lug nuts 3. The outer dual wheel 11 is now assembled to hub adapter 12 using assembly nuts 42 (see FIG. 5B). On the outer dual wheel 11, the plug 31 prevents air from escaping between the rim flange 21 and hub adapter 12. The inner dual wheel 10 can be inflated through valve 43 by removing valve cap 44, or it can be inflated through the valve 27 in the inner dual wheel 10. Air travels through vertically extending air passageway 45 disposed in hub adapter 12 and radially extending air passageway 41 disposed in hub adapter 12 into radially extending air passageway 40 in rim flange 21 and radially and vertically extending air passageway 47 in rim base 20 into inner tire cavity 50. Likewise, the outer dual wheel 11 can be inflated through valve 27 by removing valve cap 28. Air travels through radially extending air passageway 48 in rim flange 21 and radially and vertically extending passageway 49 in rim base 20 into outer tire cavity 52.

The tires 51 and 53 carry the load through wheel assemblies 10 and 11 through hub adapter 12 and onto vehicle hub 1. The wheels 10 and 11 can be piloted on the hub adapter 12 via inner pilot 60 and the outer wheel 11 can be piloted via the outer pilot 61. Hub adapter 12 centers on the vehicle hub 1 by piloting on hub pilot 4. This allows for good centering and low runout.

The common hub adapter of various embodiments allows for symmetrical loading and overall higher load carrying capability and allows for less lug/stud protrusion length because the lug nuts only need to clamp one disc instead of two. The common hub adapter of various embodiments can be replaced independently of the rims, and conversely, either rim can be replaced independently of the hub adapter (in the event that any one of the components is damaged by misuse or overloading). This tends to result in lower repair cost. The common hub adapter of various embodiments can be used with single piece rims, bolt together rims, or multi-piece rims. The dual wheel assembly can be pre-assembled separate of the vehicle, and then assembled to the vehicle as a complete sub-assembly. Alternatively, the outer wheel can be assembled to the hub adapter to minimize handling weight. Both the inner and the outer dual wheel can be inflated easily from the curb side of the vehicle. One alternative embodiment allows for both dual tires to be inflated from a single inflation valve. The system can be adapted for instant tire deflation during disassembly of the wheel assembly bolts in a methodology described by U.S. patent application Ser. No. 12/786,094 publication number US 2011/0057503 A1 published on Mar. 10, 2011, the disclosure of which is incorporated by reference herein. The components described in this invention can be made from a variety of materials including but not limited to steel or aluminum. Since aluminum wheels are generally thicker than steel wheels, the thickness of the material can allow internal air passages for centralized inflation/deflation and/or pressure regulation. Various embodiments also allow for good centering of the rims relative to the hub which will result in lower wheel runout and better ride characteristics. Various embodiments of this application use modular components to meet various design criteria. For example, the same hub adapter can be used with rims of various widths. Conversely, a given rim size can be used with various adapters to match to various hub mounting patterns or allow differences in dual wheel spacing.

Figure 8:
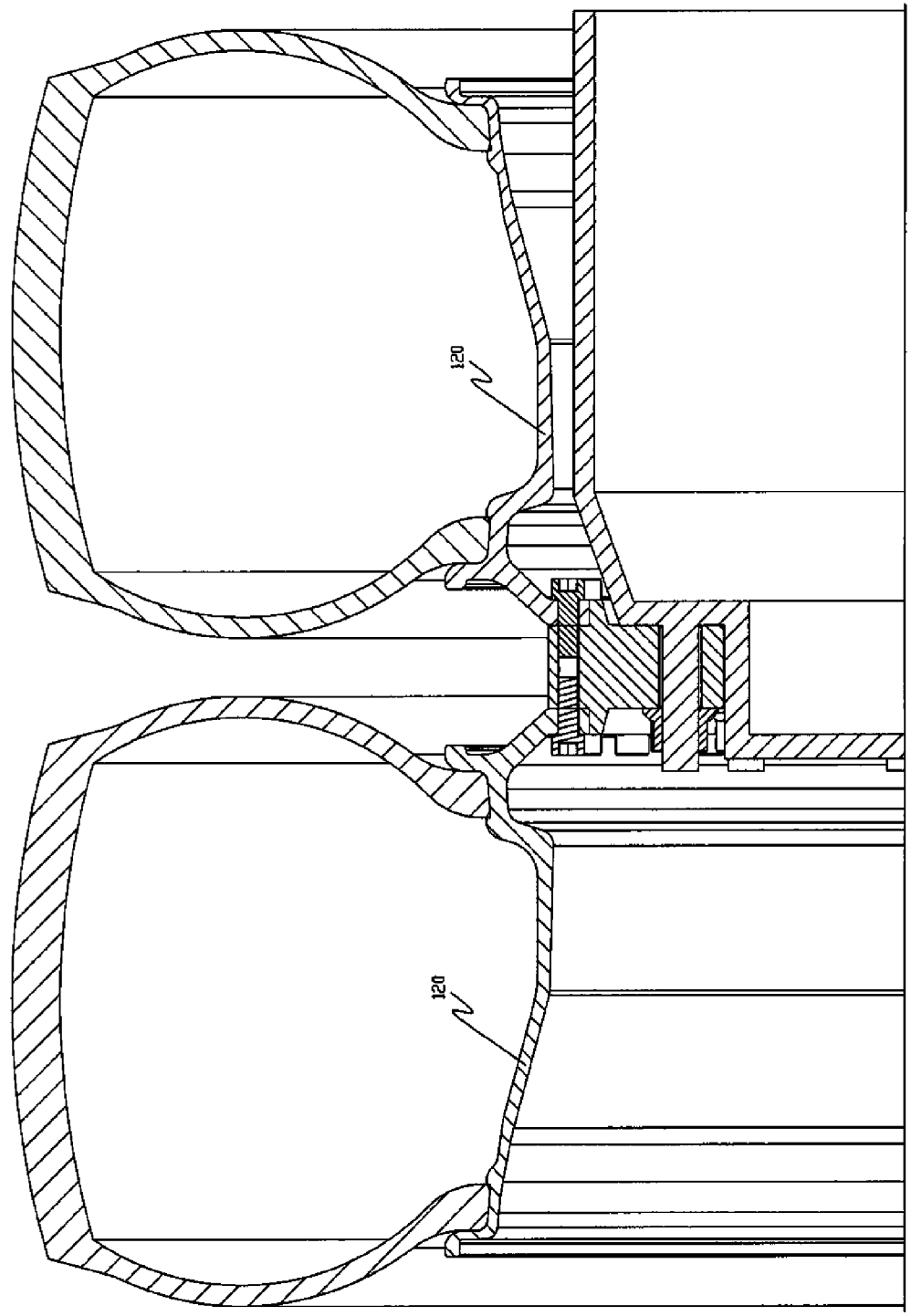
FIG. 8 illustrates a partial cross-sectional view of a dual wheel assembly according to various embodiments of another dual wheel assembly.
Figure 9:
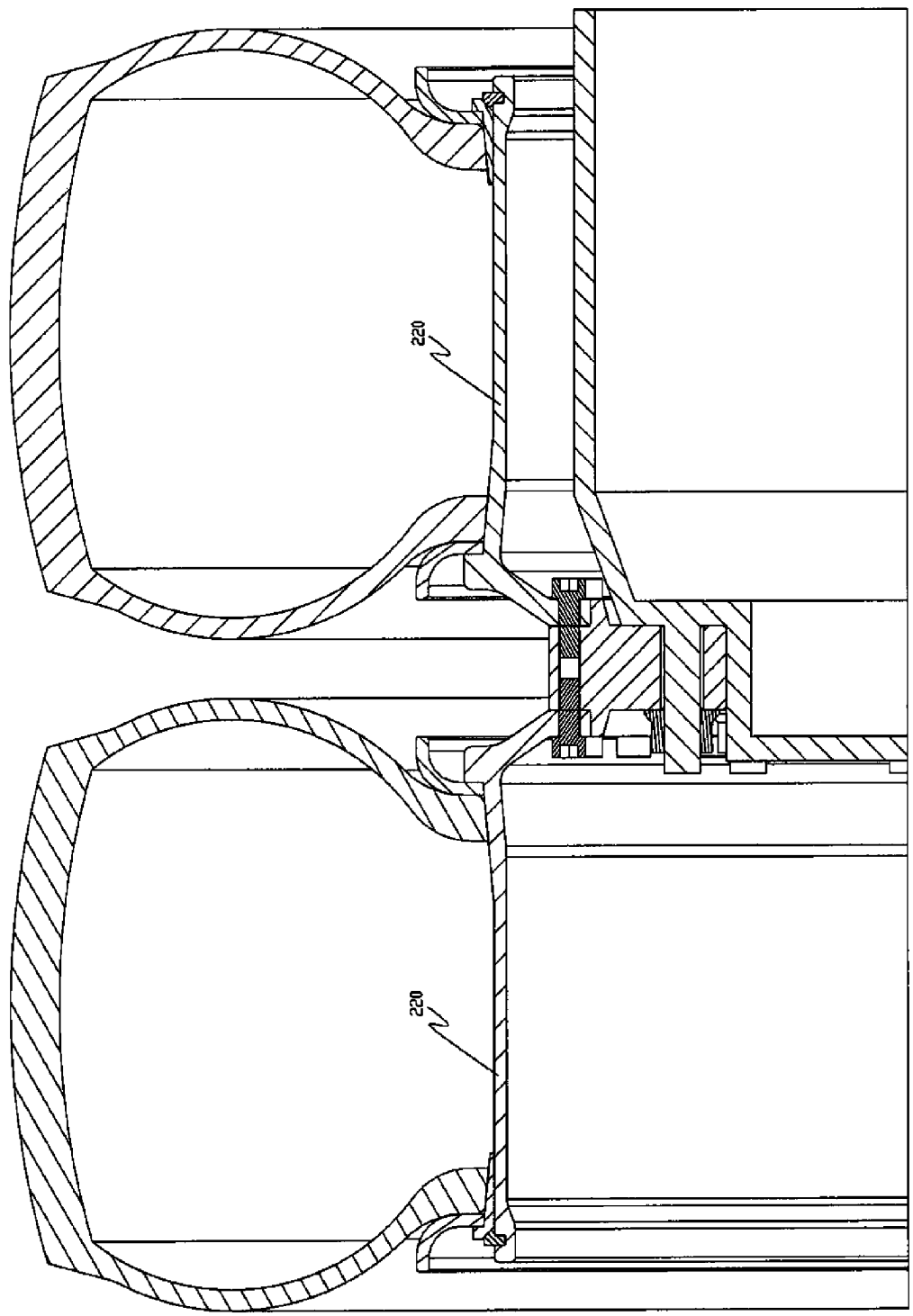
FIG. 9 illustrates a partial cross-sectional view of a dual wheel assembly according to various embodiments of yet another dual wheel assembly.
Figure 10:
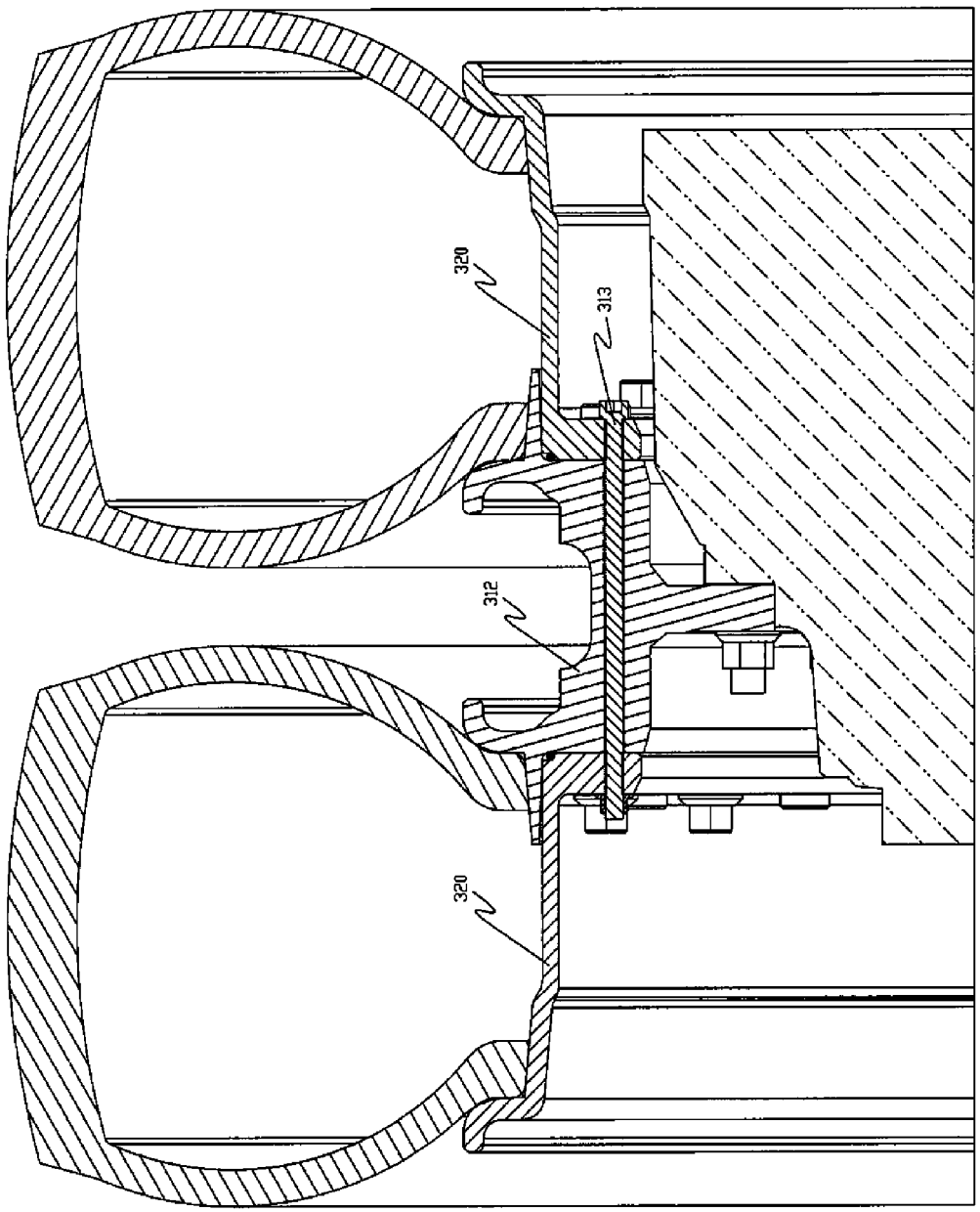
FIG. 10 illustrates a partial cross-sectional view of a dual wheel assembly according to various embodiments of yet another dual wheel assembly.
Figure 11:
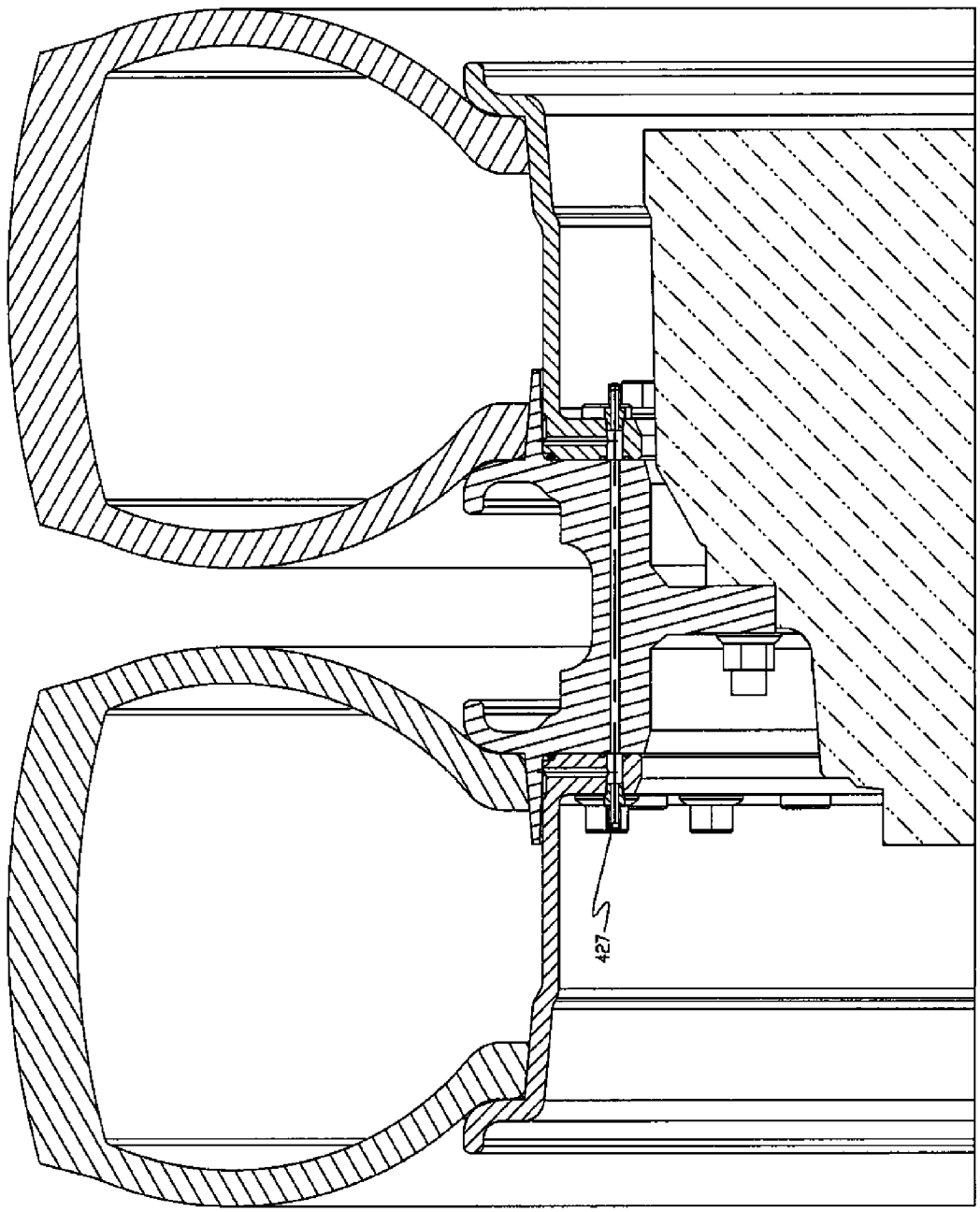
FIG. 11 illustrates a partial cross-sectional view of a dual wheel assembly according to various embodiments of yet another dual wheel assembly.

A number of alternative embodiments can be made without departing from the spirit of the invention. For example, the hub piloting system can be replaced by a stud piloted mounting system. One-piece drop center rims 120 can be used instead of a bolt together or multi-piece rim design as shown in FIG. 8. A multi-piece rim design 220 can be used as shown in FIG. 9. The rim bases 320 can be secured to the hub adapter 312 with a single set of fasteners 313 (sandwich construction) as shown in FIG. 10. FIG. 10 also shows the rim flanges made as part of the hub adapter. The rim bases 20 shown in FIG. 5A could be secured to the hub adapter 12 using bolts rather than cap screws. FIG. 11 shows another alternative embodiment. In this embodiment, one valve 427 can be used to inflate both tires simultaneously by using common porting air passageways. This design ensures that both tires have equal pressure at all times. Still another embodiment is shown in FIG. 12 where both dual rims 520 and the unitized hub 512 can be made from one piece of material forming a single integral and gaplessly continuous piece.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A system comprising:
    an inner wheel, wherein the inner wheel comprises a rim base and a rim flange;
    an outer wheel, wherein the outer wheel comprises a rim base and a rim flange;
    a hub adapter portion coaxially mounted on a vehicle hub and having a central cylindrical portion disposed between first and second end face portions, wherein the inner wheel is mounted to the first end portion, and the outer wheel is mounted to the second end face portion; and
    an air passageway configure to provide a passageway for air through the hub adapter portion, the rim flange of the inner wheel and the rim base of the inner wheel to inflate a tire mounted on the inner wheel.

2. The system of claim 1, further comprising radially spaced apart holes disposed on the central portion, wherein the spaced apart holes have end opening on opposite sides thereof.

3. The system of claim 2, further comprising a plurality of first fasteners and a plurality of second fasteners extending in opposite directions in an alternating arrangement from the first and second end face portions of the hub adapter portion, wherein each of the first fasteners extends through an end opening of a spaced apart hole and the inner wheel, and each of the second fasteners extends through an end opening of a spaced apart hole and the outer wheel.

4. The system of claim 2, wherein each of the first fasteners extends through the rim base and the rim flange of the inner wheel, and each of the second fasteners extends through the rim base and the rim flange of the outer wheel.

5. The system of claim 2, further comprising a plurality of fasteners, wherein each fastener extends through the inner rim, the hub adapter portion and the outer rim.

6. The system of claim 1, wherein the inner rim includes and inner rim base, and the outer rim includes an outer rim base and wherein the hub adapter portion includes an inner rim flange and an outer rim flange.

7. The system of claim 1, further comprising a tire mounted on the outer wheel.

8. The system of claim 1, further comprising an air passageway configured to provide a passageway for air through the rim base of the outer wheel to inflate a tire mounted on the outer wheel.

9. The system of claim 7, wherein the hub adapter portion further includes an air passageway configured to provide a passageway for air to inflate the inner tire and the outer tire.

10. The system of claim 1, wherein the hub adapter portion, inner rim and outer rim form a single integral and gaplessly continuous piece.

11. The system of claim 1, further comprising an air passageway configured to provide a passageway for air to inflate a tire mounted on the outer wheel and a tire mounted on the inner wheel.

12. The system of claim 11, wherein the air passageway comprises:
    a first portion at the rim flange of the outer wheel;
    a second portion at the rim flange of the outer wheel;
    a third portion at the hub adapter portion;
    a fourth portion at the rim flange of the inner wheel; and
    a fifth portion at the rim base of the inner wheel.

* * * * *